US006813045B1

(12) United States Patent
Ferreiro

(10) Patent No.: US 6,813,045 B1
(45) Date of Patent: Nov. 2, 2004

(54) SYSTEM AND METHOD FOR TRANSMITTING IMAGE INFORMATION TO A PLURALITY OF PREDETERMINED DESTINATIONS

(75) Inventor: Francis A. Ferreiro, Austin, TX (US)

(73) Assignee: Xerox Corporation, Stamford, CT (US)

( * ) Notice: Subject to any disclaimer, the term of this patent is extended or adjusted under 35 U.S.C. 154(b) by 894 days.

(21) Appl. No.: 09/175,080

(22) Filed: Oct. 19, 1998

(51) Int. Cl.[7] ............................................... H04N 1/100
(52) U.S. Cl. ...................... 358/400; 358/404; 358/1.15
(58) Field of Search ................................. 358/437, 444, 358/494, 296, 434, 438, 449, 474, 1.15, 400, 404

(56) References Cited

U.S. PATENT DOCUMENTS 5,363,206 A    11/1994 Fukushima .................. 358/440
5,543,938 A  * 8/1996 Fukushima .................. 358/407

* cited by examiner

Primary Examiner—Kimberly Williams
Assistant Examiner—Negussie Worku

(57) ABSTRACT

A system and method for automatically starting a dialing group upon detection of a document containing image information and transmitting said image information to a plurality of predetermined destinations comprising a first step of pre-programming and storing a dialing group of predetermined destinations in a facsimile machine. A user then inserts a document containing image information in the facsimile machine. The facsimile machine detects the presence of the document and signals the dialing group selection circuit which automatically selects the pre-programmed dialing group of predetermined destinations. The facsimile machine then prompts the user for an additional destination to send the image information. Next, the facsimile machine automatically transmits the image information to the plurality of predetermined destinations. Finally, the facsimile machine transmits the image information to the additional destination desired by the user.

7 Claims, 4 Drawing Sheets

SYSTEM AND METHOD FOR TRANSMITTING IMAGE INFORMATION TO A PLURALITY OF PREDETERMINED DESTINATIONS

TECHNICAL FIELD OF THE INVENTION

The present invention relates generally to information transmitting apparatuses. In particular, this invention relates to a transmitting apparatus which may automatically start a dialing group and transmit image information to a plurality of predetermined destinations.

BACKGROUND OF THE INVENTION

Transmitting image information using a facsimile machine is well known in the art. When transmitting image information, it is customary to send a copy of the information to alternate destinations for record keeping or other specific purposes. Conventional facsimile machines require the user to manually enter the alternate destinations. Manual entry of the alternate destinations requires more time and relies on every user to remember to send copies. A user may not have time or forget to send a copy to the alternate destination. The result is an inaccurate record of what has been sent out of the facsimile machine.

Due to the many different types of facsimile machines, another problem is that it is expensive to adapt existing facsimile machines to have the capability to automatically transmit image information to a plurality of predetermined destinations.

Yet another problem is that current facsimile machines do not provide the capability to automatically monitor the image information transmitted out of a facsimile machines. Generally, a manual log is recorded to monitor what information has been transmitted from a facsimile machine. In most cases, the log is inaccurate, thus causing security problems.

SUMMARY OF THE INVENTION

The present invention provides a system and method for sending image information through a facsimile machine in a way that substantially eliminates or reduces disadvantages and problems associated with previously developed image information transmission systems and methods.

More specifically, the present invention provides a system and method for automatically selecting a dialing group upon detection of a document containing image information and transmitting said image information to a plurality of predetermined destinations.

The system and method for transmitting image information to a plurality of predetermined destinations using a facsimile machine comprises a first step of pre-programming and storing a dialing group of predetermined destinations in a facsimile machine. A user then inserts a document containing image information in the facsimile machine. The facsimile machine detects the presence of the document and signals a dialing group selection circuit. The dialing group selection circuit includes a detecting circuit which detects a document placed in a receiving aperture of a facsimile machine. The dialing group selection circuit also includes a sequential switching circuit which receives an electrical reset signal from the detecting circuit. The sequential switching circuit also automatically activates a single-button dialer associated with a pre-programmed dialing group of predetermined destinations. Finally, the dialing group selection circuit also includes an oscillator circuit which receives a reset signal from the detecting circuit initiating a timer. The facsimile machine then prompts the user for an additional destination to send the image information.

Next, the facsimile machine automatically transmits the image information to the plurality of predetermined destinations. Finally, the facsimile machine transmits the image information to the additional destination desired by the user.

The present invention provides an important technical advantage by providing a system and method for automatically selecting a dialing group of predetermined destinations upon insertion of a document into a facsimile apparatus, thus eliminating the need to manually enter the predetermined destinations.

The present invention provides another important technical advantage by providing an inexpensive way of adapting existing facsimile machines to have the capability to automatically transmit image information to a plurality of predetermined destinations.

The present invention provides another important technical advantage by providing a system which may be attached to a plurality of different facsimile machines.

The present invention provides another important technical advantage by providing a method of keeping accurate records of all image information transmitted out of a facsimile machine.

The present invention provides another important technical advantage by providing a method of monitoring all image information transmitted out of a facsimile machine for security purposes.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The system and method for transmitting image information to a plurality of predetermined destinations of the present invention provides a way to automatically start a dialing group upon detection of a document containing image information and transmit said image information to a plurality of predetermined destinations. This is accomplished by first pre-programming a dialing group of predetermined destinations in a facsimile machine. The preprogrammed dialing group of predetermined destinations are stored in memory located in the facsimile machine. A user then inserts a document or plurality of documents containing image information in the facsimile machine. The facsimile machine detects the presence of the document and sends a signal to the dialing group selection circuit 100 which automatically selects switches for accessing the preprogrammed dialing group of predetermined destinations.

Next, the switches for automatically accessing the preprogrammed dialing group of predetermined destinations are released. The user is then prompted by the facsimile machine to manually enter additional desired destination(s) to send the image information. Finally, the user pushes the appropriate panel button to start the facsimile machine transmitting device to transmit the document image information. At this point, the document image information is automatically transmitted to each predetermined destination (s) in the selected dialing group. The image information is also transmitted to the additional destination(s) desired by the user.

In an alternative embodiment, before selecting a preprogrammed dialing group of predetermined destinations, a particular facsimile machine may require the additional steps of selecting a single-button dialer, turning off power saver mode, and selecting group dial mode.

In another alternative embodiment, if the user decides not to send the image information to the predetermined destination(s), the user can push a stop button before pushing any other appropriate panel buttons to start the facsimile machine transmitting device, and the image information will only be sent to the additional destination(s) desired by the user.

Figure 1:
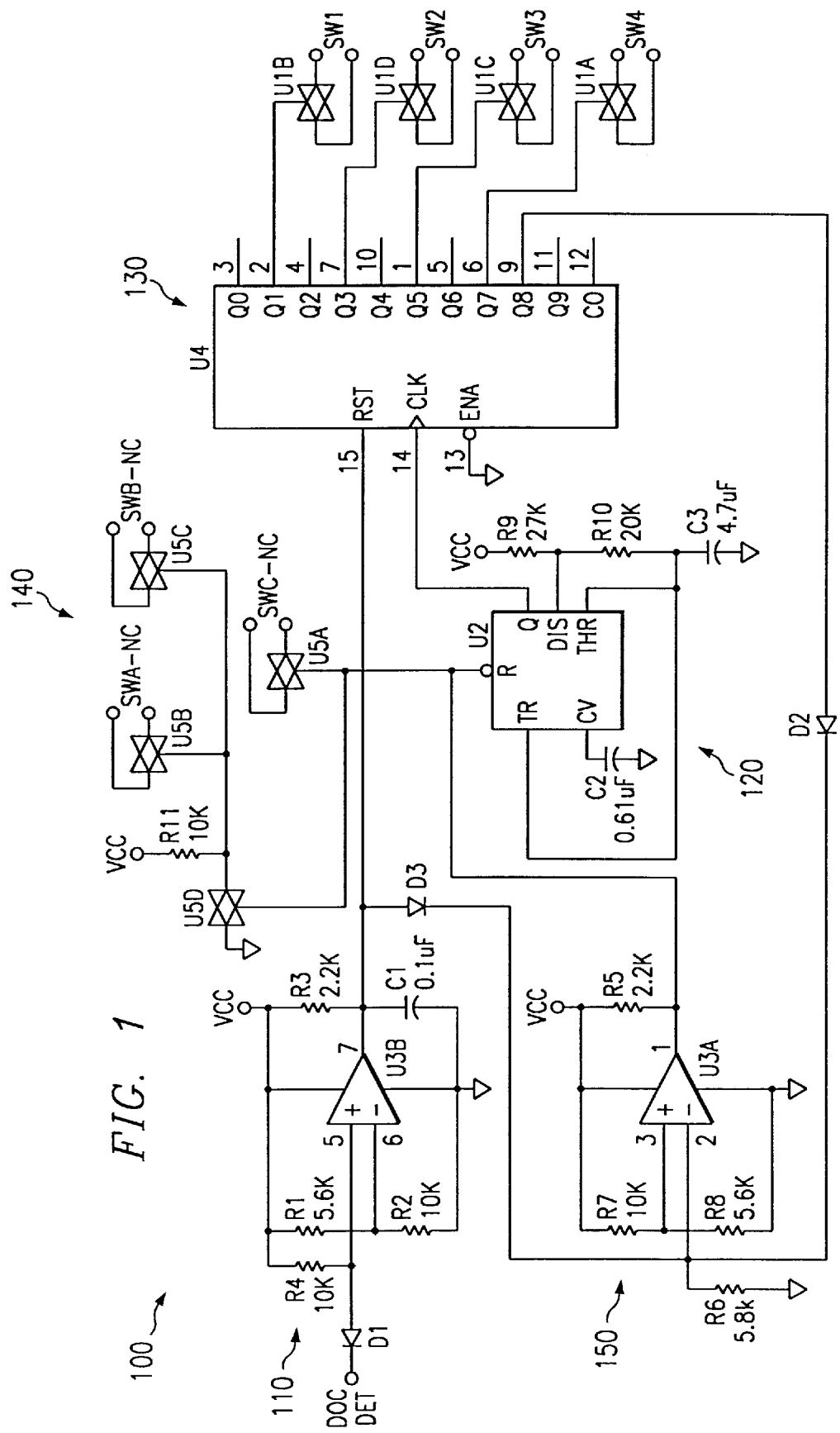
FIG. 1 shows a diagram of dialing group selection circuit comprising a document detector circuit, a timing circuit, a sequential switching circuit, and an optional page switching circuit in accordance with this invention.

The embodiment for the system and method for transmitting image information to a plurality of predetermined destinations depicted in FIG. 1 shows the dialing group selection circuit 100 comprising a document detector circuit 110, an oscillator circuit 120, a sequential switching circuit 130, an optional paging circuit 140, and an oscillator control circuit 150. The document detector circuit 110 provides an electrical signal which sets the sequential switching circuit 130 and signals the oscillator control circuit 150 to start the oscillator circuit 120 and sets the switches of the optional paging circuit 140. The oscillator circuit 120 provides a series of clock pulses to the decade counter which closes and opens the switches of the sequential switching circuit 130. Upon completion of cycling through switch once, the sequential switching circuit 130 sends a feedback signal to the oscillator control circuit 150 which resets the switches of the optional paging circuit 140 and halts the oscillator circuit 120 which stops any further automatic selection of a preprogrammed dialing group of predetermined destination(s). When the last page of the document(s) to be transmitted passes through the feeder mechanism of the facsimile machine the document detector circuit 110 provides an electrical signal to reset the decade counter of the sequential switching circuit 130 and continue to hold the oscillator circuit 120. The dialing group selection circuit 100 remains in this initial standby condition until the next document(s) are detected.

The document detecting circuit shown in FIG. 1 comprises a diode D1, a voltage comparator U3B, a capacitor C1 and a plurality of resistors all electrically connected together. The oscillator circuit 120 comprises a timer U2, a voltage comparator oscillator control circuit 150, and a plurality of resistors and capacitors all electrically connected together. The voltage comparator circuit 150 of the timing circuit 120 comprises a voltage comparator U3A and a plurality of resistors all electrically connected together. The sequential switching circuit 130 comprises a decade counter U4, and a plurality of switches SW1, SW2, SW3, and SW4 all electrically connected together. The optional paging circuit 140 comprises a plurality of switches SWA, SWB, SWC and U5D all electrically connected together.

Initially, pin 5 and pin 6 of voltage comparator U3B are high and low respectively. When a document or documents are placed in a document feeding aperture of a facsimile machine, diode D1 will conduct and pin 5 of voltage comparator U3B goes low. Once pin 5 of voltage comparator U3B goes low, pin 7 of voltage comparator U3B goes low and sets the decade counter U4. At this point, decade counter U4 is now free to run.

The low signal from pin 7 of voltage comparator U3B does not allow diode D3 to conduct which induces a low signal at pin 2 of voltage comparator U3A. The voltage at pin 2 of voltage comparator U3A is now low. Once the voltage at pin 2 of voltage comparator U3A goes low, pin 1 of voltage comparator U3A goes high and sets the timer U2. At this point, the timer begins running.

The high signal from pin 1 of voltage comparator U3A also feeds into the optional paging circuit 140. The high signal from output pin 1 of voltage comparator U3A simultaneously causes switches SWC and U5D to close. Switches SWA and SWB are normally closed. Once switch U5D closes, SWA and SWB open. The switches SWC, SWA, and SWB of optional paging circuit 140 are used to access pages associated with a plurality of single button group dialers of a facsimile machine. Some facsimile machines may have up to three pages per single button. The optional page switching circuit 140 allows a user to access any page associated with a particular button located on a facsimile machine having this capability.

Once the timer U2 starts running, it sends an output signal to the pin 14 of decade counter U4.

Since the decade counter U4 has already been set, the pulse signal from the timer U2 starts the decade counter U4 running. Each pulse from the timer U2 is approximately 200 milliseconds. On the rising edge of a first clock pulse of decade counter U4, output Q0 is skipped, Q1 goes from a high to a low causing switch SW1 to close, switches SWA and SWB open, and switch SWC closes. Once switch SW1 closes, it may activate a group dial mode.

On the rising edge of a second clock pulse of decade counter U4, Q1 goes from a high to a low causing switch SW1 to open. At the same time, Q2 goes from a low to a high, but has no effect. On the rising edge of a third clock pulse of decade counter U4, Q2 goes from a high to a low and Q3 goes from a low to a high causing switch SW2 to close. Once switch SW2 is closed, a particular dialing group of predetermined destinations can be selected.

On the rising edge of a fourth clock pulse of decade counter U4, Q3 goes from a high to a low causing switch SW2 to open. At the same time, Q4 goes from a low to a high, but has no effect. On the rising edge of a fifth clock pulse of decade counter U4, Q4 goes from a high to a low and Q5 goes from a low to a high causing switch SW3 to close. Once switch SW3 is closed, a yes or enter signal optionally required by some fax machines can be selected. On the rising edge of a sixth clock pulse of decade counter U4, Q5 goes from a high to a low causing switch SW3 to open. At the same time, Q6 goes from a low to a high, but has no effect. On the rising edge of a seventh clock pulse of decade counter U4, Q6 goes from a high to a low and Q7 goes from a low to a high causing switch SW4 to close. Once switch SW4 is closed, a second yes or enter signal optionally required by some fax machines can be selected.

On the rising edge of an eighth clock pulse of decade counter U4, Q7 goes from a high to a low causing switch SW4 to open, switches SWA and SWB close, and switch SWC opens. At the same time, Q8 goes from a low to a high causing diode D2 to conduct which causes pin 2 of voltage comparator U3A to go from a low to a high.

Once pin 2 of voltage comparator U3A goes high, pin 1 of voltage comparator U3A goes low causing the timer U2 to reset and stop running. The low signal from pin 1 of voltage comparator U3A also feeds into the optional paging circuit 140. The low signal from pin 1 of voltage comparator U3A simultaneously causes switches SWC and U5D to open. Once switch U5D opens, switches SWA and SWB close. When the last page of the document passes through the feeder mechanism of the facsimile machine, diode D5 stops conducting and pin 5 of U3B goes high resetting all components of the dialing group selection circuit 100 back to their initial conditions, thus halting all operations of the dialing group selection circuit 100. The process will repeat itself at the detection of another document or plurality of documents.

Figure 2:
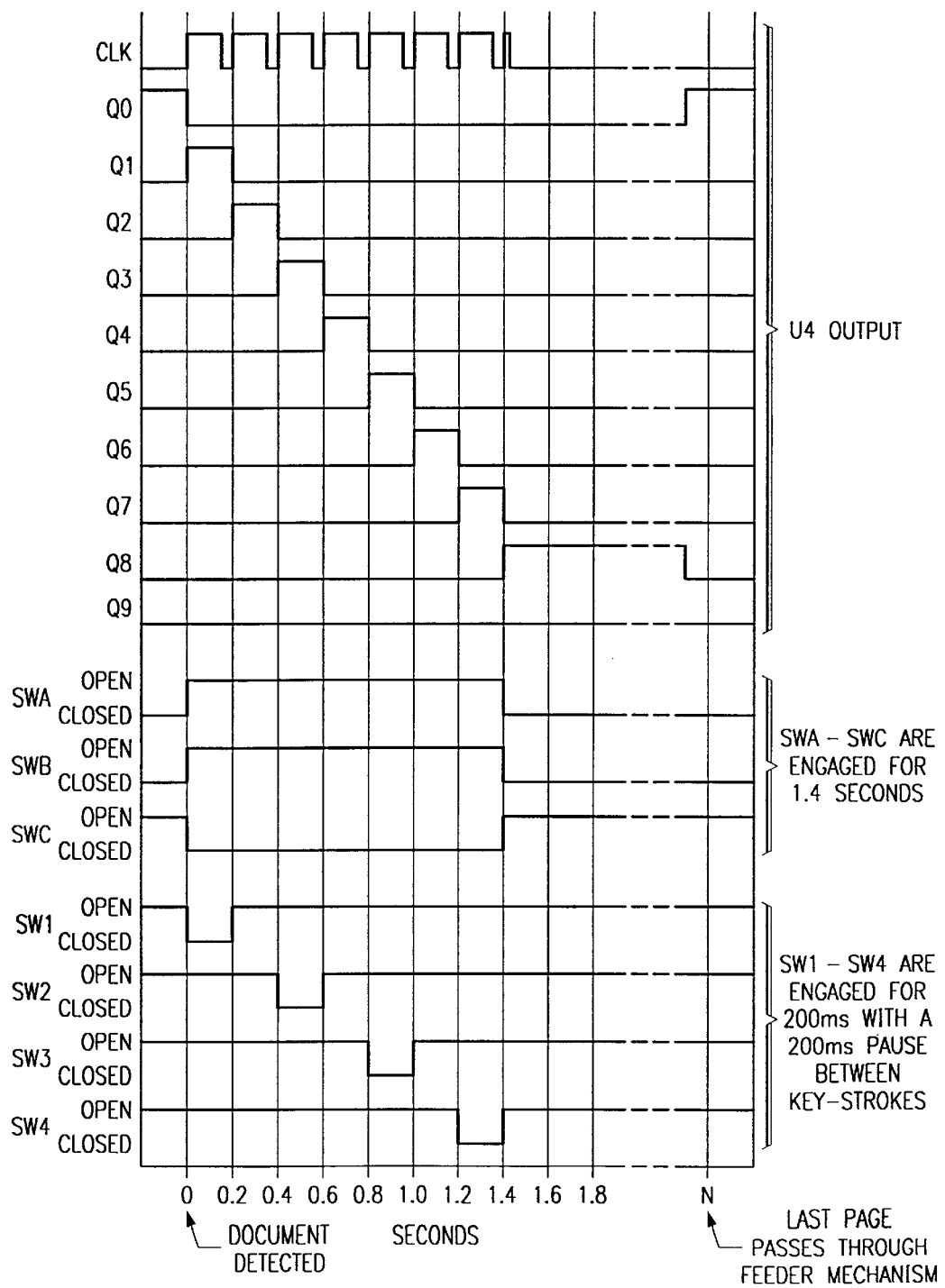
FIG. 2 shows a timing diagram depicting at least one way the sequential order of operations may occur over time in the dialing group selection circuit.

FIG. 2 shows a timing diagram depicting at least one way in which the sequential order of operations may occur over time in the dialing group selection circuit 100. Just before the rising edge of a first clock pulse at time equals 0 seconds, the dialing group selection circuit 100 is in its home or standby state. At time equals 0 seconds, a document placed in the facsimile machine is first detected. Once the document is detected at time equals 0 seconds, a series of operations occur: a first clock (CLK) pulse rises from a low to a high, the timer U2 starts, output Q0 of decade counter U4 drops from a high to a low, output Q1 goes from a low to a high; switches SWA and SWB open, switch SWC closes, and switch SW1 closes. When switch SW1 closes, it can activates a group dial mode. Once switches SWA and SWB open and switch SWC closes at time equals 0 seconds, these switches remain in this same state for the whole series of oscillations until time equals 1.4 seconds as shown in FIG. 2. The rising edge of a second clock pulse occurs at 0.2 seconds. At 0.2 seconds, the output pin Q1 goes from a high to a low, output pin Q2 goes from a low to a high, and switch SW1 opens.

The rising edge of a third clock pulse occurs at 0.4 seconds. At 0.4-seconds, output pin Q2 goes from a high to a low, output pin Q3 goes from a low to a high, and switch SW2 closes. When switch SW2 closes, it can select a particular dialing group of predetermined destinations. The rising edge of a fourth clock pulse occurs at 0.6 seconds. At 0.6 seconds, output pin Q3 goes from a high to a low, output pin Q4 goes from a low to a high, and switch SW2 opens.

The rising edge of a fifth clock pulse occurs at 0.8 seconds. At 0.8 seconds, output pin Q4 goes from a high to a low, output pin Q5 goes from a low to a high, and switch SW3 closes. When switch SW3 closes, it can activates a yes or enter signal optionally required by some fax machines. The rising edge of a sixth clock pulse occurs at 1.0 second.

At 1.0 second, output pin Q5 goes from a high to a low, output pin Q6 goes from a low to a high, and switch SW3 opens.

The rising edge of the seventh clock pulse occurs at 1.2 seconds. At 1.2 seconds, output pin Q6 goes from a high to a low, output pin Q7 goes from a low to a high, and switch SW4 closes. When switch SW4 closes, it can activate a second yes or enter signal optionally required by some fax machines. The rising edge of an eighth clock pulse occurs at time 1.4 seconds. At 1.4 seconds, output pin Q7 goes from a high to a low, output pin Q8 goes from a low to a high, switches SWA and SWB close, switch SWC opens, and switch SW4 opens.

Referring back to FIG. 1, when output pin Q8 goes from a low to a high, a signal feeds back through diode D2 causing pin 2 of voltage comparator U3A to go from a low to a high. This puts the timer U2 in reset mode. When the timer U2 goes into reset mode, the clock freezes.

At this point, the document(s) feed into the facsimile machine are being stored in the facsimile machine memory. When the last document page passes the feeding mechanism, the document detector circuit 110 goes back to its initial state and resets the entire dialing group selection circuit 100. At the same time, pins Q0 and Q8 of decade counter U4 return back to their initial state at time equals N seconds as shown in FIG. 2.

Figure 3:
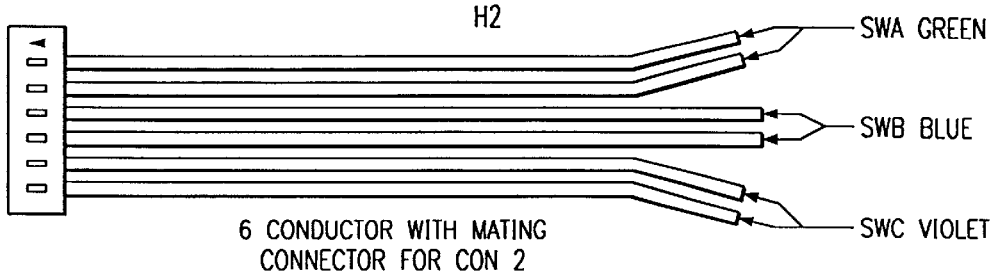
FIG. 3 shows a diagram of harness H2 which electrically connects a portion of the dialing group selection circuit to a facsimile machine in accordance with this invention.

FIG. 3 shows an embodiment of harnesses H2. harness H2 is used to electrically connect switches SWC, SWA, and SWB of the optional paging circuit to a facsimile machine. Switches SWC, SWA and SWB must be electrically connected in parallel with the appropriate panel switches of the facsimile machine.

Figure 4:
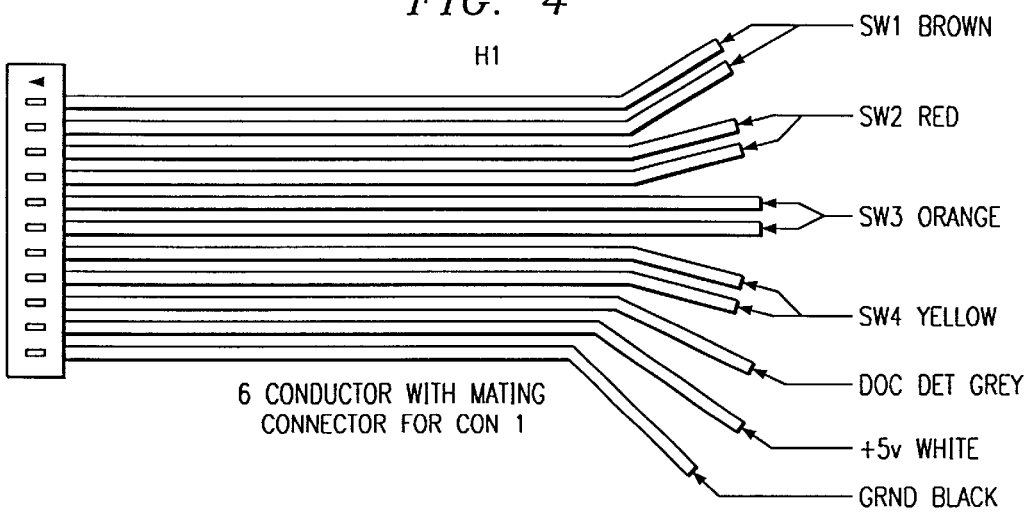
FIG. 4 shows a diagram of harness H1 which electrically connects a portion of the dialing group selection circuit to a facsimile machine in accordance with this invention.

FIG. 4 shows an embodiment of harness H1. The harness H1 is used to electrically connect power, ground, the document detection circuit and switches SW4, SW1, SW3, and SW2 of the sequential switching circuit 130 to a facsimile machine.

Figure 5:
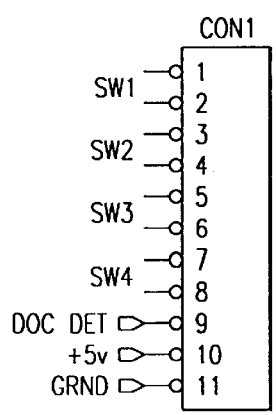
FIG. 5 shows a diagram of the harness connector CON1 which mates with harness H1 in accordance with this invention.

FIG. 5 shows an embodiment of the harness connector CON1. FIG. 5 shows how CON1 and harness H1 electrically connect together. The harness connect CON1 and harness H1 are used to electrically connect switches SWA, SWB, and SWC of the dialing group selection circuit 100 to a facsimile machine.

Figure 6:
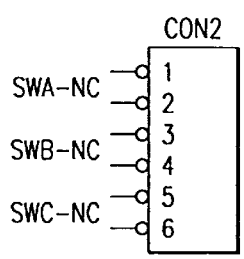
FIG. 6 shows a diagram of the harness connector CON2 which mates with harness H2 in accordance with this invention.

FIG. 6 shows an embodiment of the harness connector CON2. FIG. 6 shows how CON2 and harness H2 electrically connect together. The harness connector CON2 and harness H2 are used to electronically connect switches SW1, SW2, SW3, and SW4 of the dialing group selection circuit to a facsimile machine.

Figure 7:
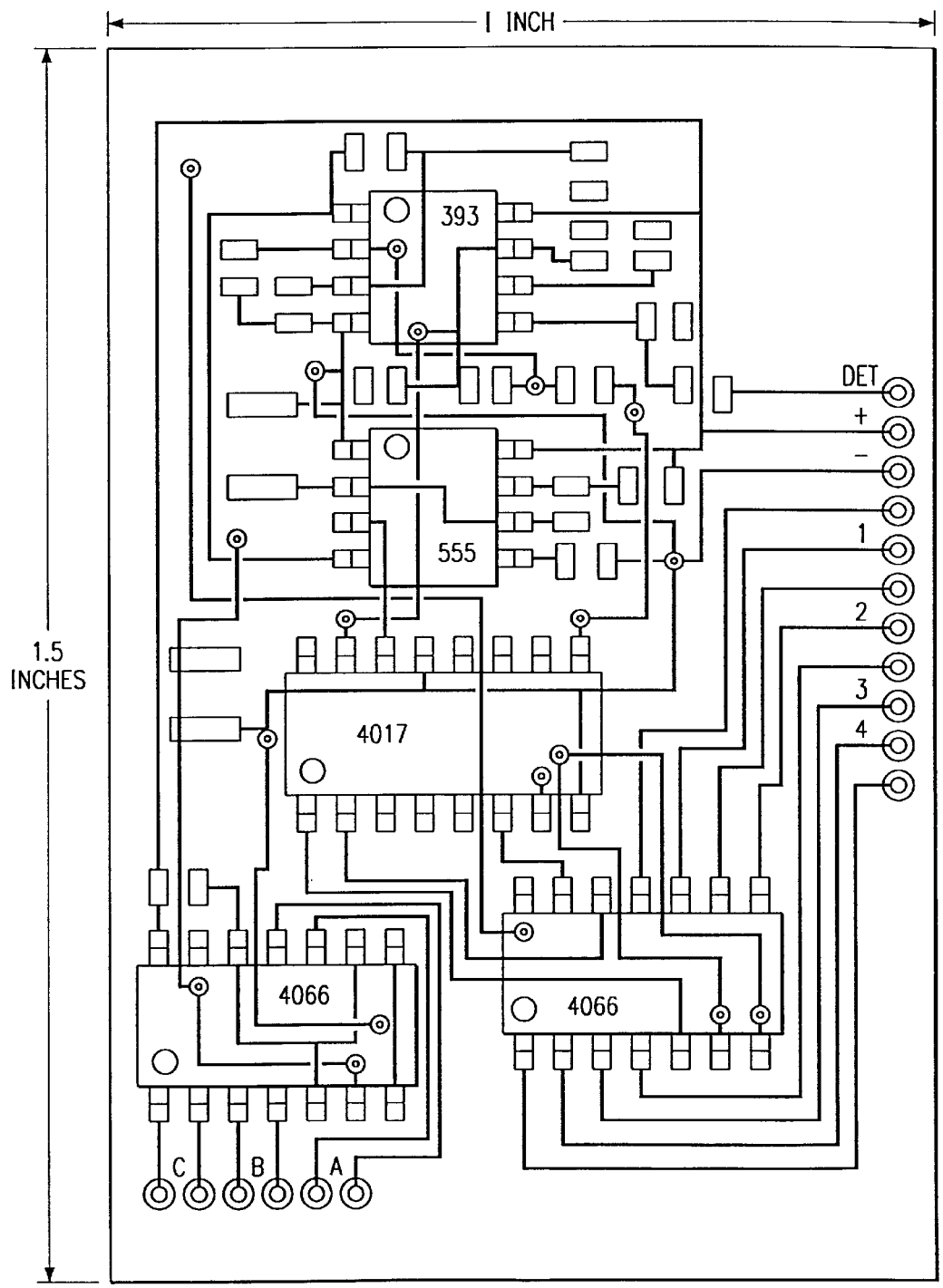
FIG. 7 shows a diagram of the layout for the printed circuit board of the dialing group selection circuit depicting the maximum allowable real estate available in accordance with this invention.

FIG. 7 shows an embodiment of the printed circuit board lay out for the dialing group selection circuit 100. FIG. 7 also shows that the maximum allowable real estate for the dialing group selection circuit 100 as being 1 inch by 1.5 inches.

In summary, the present invention provides a system and method for transmitting image information to a plurality of predetermined destinations. An initial user pre-programs a plurality of predetermined destinations in a single button group dialer of a facsimile machine. Any user may then place a document or group of documents into a document feeding aperture of a facsimile machine. The dialing group selection circuit detects the document or plurality of documents and automatically accesses a pre-programmed single button dialer. The facsimile machine then prompts the user for an additional desired destination. The user enters the additional desired destination and transmits the document or plurality of documents. The facsimile machine automatically transmits the image information to the predetermined destinations. Finally, the facsimile machine transmits the image information to the additional destination input by the user.

This system and method is ideal for both security and record keeping purposes. Any user other than the initial user who pre-programmed the initial destinations may not know where copies of all image information transmitted out of the facsimile machine have been transmitted to. This provides a way for one to know what image information is being transmitted out of the facsimile machine for security purposes. It also provides a way for copies to be automatically transmitted to a predetermined location for record keeping purposes. Finally, this invention is cost effective and can be electrically connected to a plurality of different types of facsimile machines.

Although the present invention has been described in detail, it should be understood that various changes, substitutions and alterations can be made hereto without departing from the spirit and scope of the invention as described by the appended claims.

What is claimed is:

1. An image information transmitting method in a facsimile machine, comprising the steps of:

pre-programming a dialing group of predetermined destinations in said facsimile machine;

storing said pre-programmed dialing group of predetermined destinations in said facsimile machine;

detecting the presence of a document in said facsimile machine;

automatically selecting switches for accessing said pre-programmed dialing group of predetermined destinations;

automatically selecting a switch for manually entering an additional destination desired by said user;

automatically releasing said switches for accessing said pre-programmed dialing group of predetermined destinations;

entering said additional destination desired by said user;

following said step of entering said additional destination, automatically transmitting image information from said document to each of said predetermined destinations of said pre-programmed dialing group; and transmitting said image information from said document to said additional destination desired by said user.

2. The method of claim 1, before automatically selecting said pre-programmed dialing group of predetermined destinations, further comprising the steps of automatically:

selecting a single-button dialer;

turning off power saver mode; and selecting group dial mode.

3. The method of claim 1, after automatically selecting said pre-programmed dialing group of predetermined destinations, further comprising the step of automatically accessing a particular page associated with a particular single button dialer located on said facsimile machine.

4. The method of claim 1, wherein a plurality of documents may be inserted into said facsimile machine.

5. The method of claim 1, wherein said pre-programmed dialing group of predetermined destinations is pre-programmed by an initial user so that a copy of all image information from documents transmitted by subsequent users will automatically be transmitted to said pre-programmed dialing group of predetermined destinations.

6. The method of claim 1, wherein a plurality of dialing groups containing a plurality of predetermined destinations may be initially pre-programmed.

7. The method of claim 1, wherein during the automatic transmission of said image information from said document to each said predetermined destination of said pre-programmed dialing group, pushing a stop button to terminate said automatic transferring of said image information from said document and only transmitting said image information from said document to said additional destination desired by said user.

* * * * *